Oct. 19, 1971
S. R. CREES
3,613,430
WIRE BENDING APPARATUS
Filed July 25, 1969
2 Sheets-Sheet 1
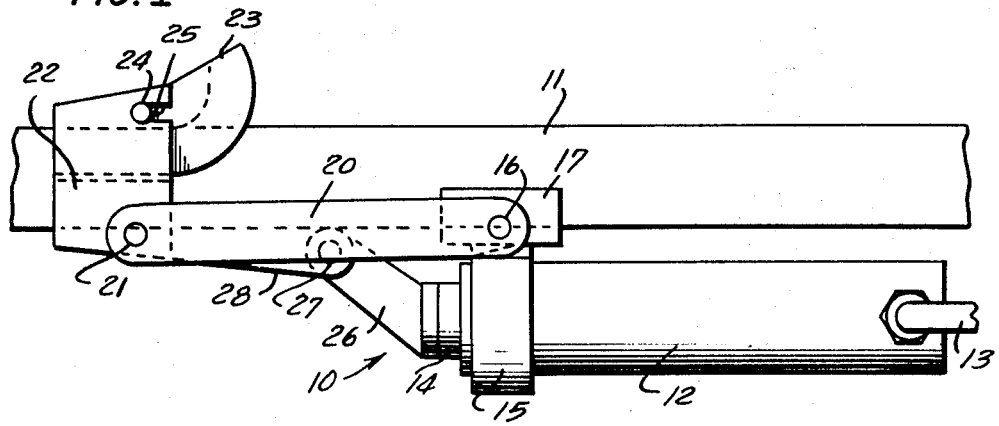
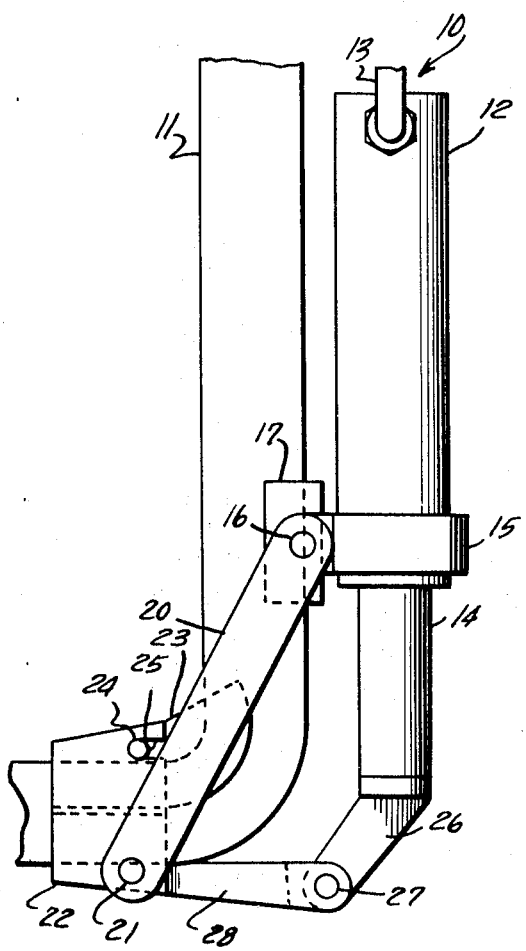
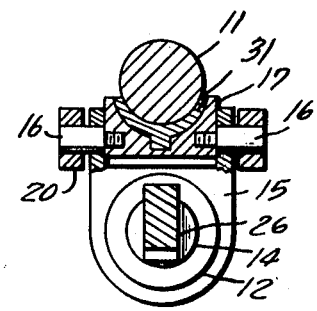
SILAS R. CREES
INVENTOR.
BY Duckworth & Hobby
Attorneys Oct. 19, 1971   S. R. CREES   3,613,430
WIRE BENDING APPARATUS
Filed July 25, 1969   2 Sheets-Sheet 2
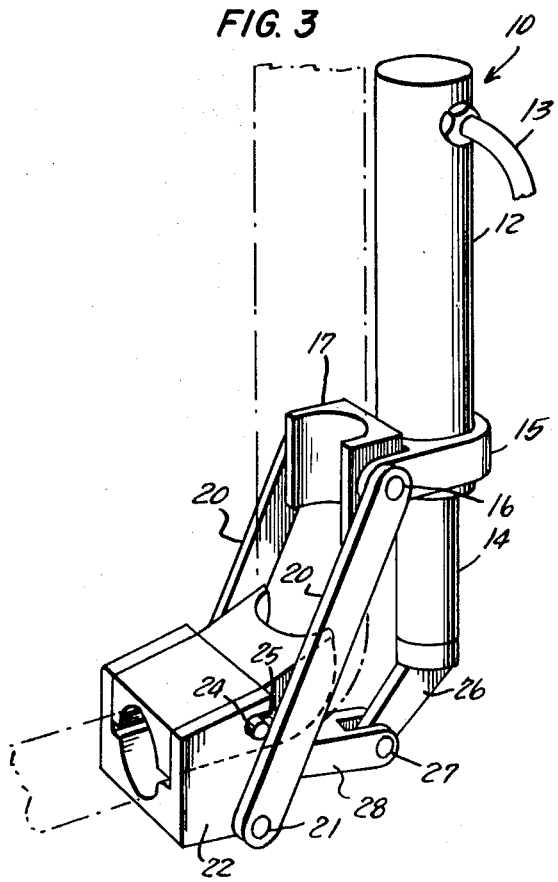
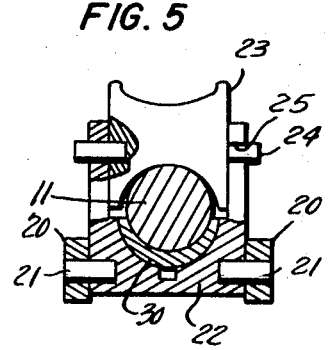
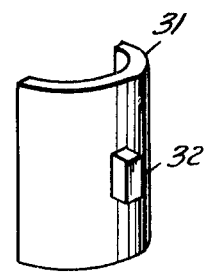
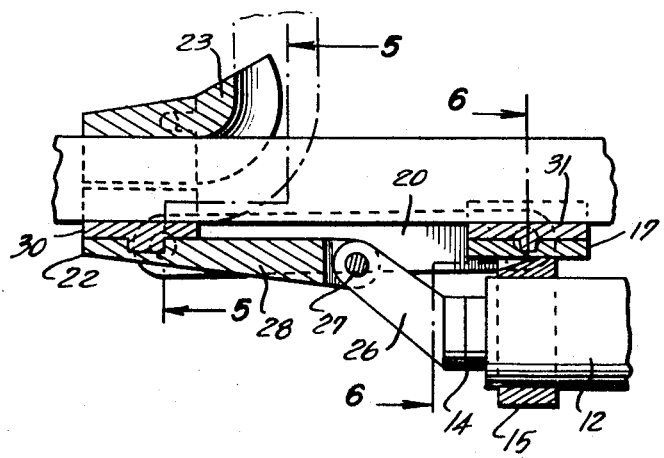
SILAS R. CREES
INVENTOR.
BY Duckworth & Hobby
Attorneys United States Patent Office 3,613,430
Patented Oct. 19, 1971

3,613,430
WIRE BENDING APPARATUS
Silas R. Crees, 1170 Sarno Road, Eau Gallie, Fla. 32935
Filed July 25, 1969, Ser. No. 844,836
Int. Cl. B21d *11/04*
U.S. Cl. 72—318
14 Claims

ABSTRACT OF THE DISCLOSURE

A wire bending apparatus for bending electrical cables, or the like, in narrow confines such as panel boxes. The apparatus is connected to an electrical conductor by a wire holding member which is connected to a hydraulic cylinder by two separate linkages, one connected to the hydraulic cylinder and one connected to the rod of the cylinder. The hydraulic cylinder also has a wire engaging member attached thereto and when the hydraulic cylinder is actuated the engaging member bends the wire around the wire guide on the wire holding member.

BACKGROUND OF THE INVENTION (1) Field of the invention

The present invention relates to wire benders and more particularly to a hydraulic actuated electrical conductor bender adapted to bend an electrical conductor inside a panel box, junction box, switchboard, or the like.

In the electrical contracting work after panel boxes, and the like, are installed and connected to conduit, or the like, the electrical wire or cable is pulled taut and fastened to the box. When heavy conductors are used, a steel fish tape may be needed to draw the cable through the conduit. Conductors may also be pulled tight using block and tackle or special machines including winches for pulling the cable tight. Once the conductors are installed in conduits, raceways, junction box, panel box, or the like, it may be bent to the desired degree and into proper position, and then cut to length for fastening to terminals within the box. When heavy cable is being used, it becomes very difficult to bend it within a box, or the like, in narrow confines. This in turn results in damage to cable, waste in time, expensive cable and strenuous working conditions.

(2) Description of the prior art

In the past various types of hickeys and benders have been used to bend thin-walled and rigid conduits. These benders are sometimes bench types and may be hydraulically operated to bend the conduit for installation. These devices, however, are not generally useful for bending the ends of heavy conductor cables for connection to various types of connectors. For instance, the benders are big, relatively bulky devices that cannot be used in tight quarters such as in working inside panel and junction boxes, and the like. These benders generally are made for inserting a piece of conduit prior to installation, then gripping it in some manner at one point and applying force to another point on the pipe to bend it around a curved guide having a predetermined radius to bend the pipe at a desired curvature which must be large enough to prevent coupling of the pipe at the bend.

Machines have also been suggested in the past for bending metal rails, beams, bars, and the like. One such machine is used in the manufacture of chain links and is, of course, bulky and for use only in a manufacturing plant. Another such device is used in the manufacture of springs and yet another such machine is used to bend rails in train tracks and other very heavy metal stock.

SUMMARY OF THE INVENTION

The present invention is a wire bending apparatus for bending electrical cables, and the like, in tight spots such as panel boxes and has an actuating means such as a hydraulic cylinder with a pushing or extending rod. A wire holding member is adapted to snap onto an electrical conductor and hold the apparatus, and is connected to the hydraulic cylinder actuating means by a link having a pivot on the holding member and on the hydraulic cylinder member. The wire holding member also is held to the hydraulic cylinder rod by a second connection linkage so that when the hydraulic cylinder is actuated the hydraulic cylinder rod pushes the hydraulic cylinder which has a wire engaging member connected to it for engaging the wire separate from the wire holding means. The hydraulic cylinder and the wire engaging member connected thereto bend the wire around the guide located on the wire holding member. Thus the hydraulic cylinder and most of the linkage remain parallel to or very close to the electrical conductor so as to operate well in tight spots and not interfere with other conductors and members within the panel box. The wire holding member guide is a sheave-like member for engaging the wire for the desired degree of bend and is easily interchangeable in the wire holding member. The wire holding member also has easily interchangeable inserts for holding different sizes of electrical cable, and the like.

BRIEF DESCRIPTION OF THE DRAWINGS

Other objects, features and advantages of this invention will be apparent from a study of the written description and the drawings, in which:

FIG. 1 is a side elevation view of one embodiment of the present invention prior to bending an electrical conductor;

FIG. 2 is a side elevation view of the embodiment of FIG. 1 after bending the electrical conductor;

FIG. 3 is a perspective view of the embodiment of FIG. 2;

FIG. 4 is a sectional view taken substantially on the center line of the conductor being bent and illustrating the reducing insert for adapting the present invention to bend smaller diameter cable;

FIG. 5 is a sectional view taken along line 5—5 of FIG. 4, with additional parts broken away;

FIG. 6 is a sectional view taken along line 6—6 of FIG. 4; and

FIG. 7 is a perspective view of one of the reducing inserts.

DESCRIPTION OF THE PREFERRED EMBODIMENT

FIGS. 1 and 2 show a preferred embodiment 10 of the present invention having a wire or electrical conductor 11 therein, and shown prior to being bent in FIG. 1 and after bending in FIG. 2. A hydraulic cylinder 12 may have an inlet hose 13 and a cylinder rod 14 adapted for pushing or extending out from the cylinder in which direction the force is applied. A sleeve 15 is fixedly attached to the cylinder 12 which sleeve may be round or square or any other shape but must be sufficiently strong to withstand the substantial force that is applied at pivot 16. Pivot 16 may be connected to the sleeve 15 or may be connected to a wire engaging member 17 which is arcuate or sheave-like in design to engage the wire 11 in the bending operation. A pair of parallel links 20 are movable connected at pivots or pins 16 on the one end and movable connected at the pivots 21 at the other end. The pins 21 are connected to the wire holding member 22 which is adapted to be slid onto a wire or alternatively may have a rapid connect and disconnect means for connecting to a wire or electrical conductor, or the like. Since the conductor being bent is usually in tight quarters such as a panel box, it has been found convenient to have a wire holding member 22 with a disconnect member 23 forming a bore therethrough, as illustrated in this emobdiment. The wire holding disconnect member 23 also acts as a wire guide and is easily interchangeable by a pin 24 slidably connected in a cleavage 25. The pin 24 remains in the cleft of the cleavage 25 and is provided additional support by the wire 11 being held to the wire holder 22. The wire guide 23 forms a part of a circle, or an arc, which is sheave-like or arcuate in design for the wire to be bent around and determines the arch curvature of the bend in the wie 11 after the bending operation. For small wires, it might be desirable to have a quickly interchangeable member 23 more suitable for the small conductor. This will work in conjunction with inserts for smaller wires adapted to be fitted inside of wire holding member of block 22, as will be desicrbed in more detail later.

Cylinder rod 14 has an oblique extending arm 26 extending from the end of the rod and being fixedly attached to the rod. The arm is connected by a pin or pivot 27 to an arm 28 which extends from wire holding member 22 and is fixedly attached thereto. As the rod 14 extend and retracts within the cylinder 12, arm 26 will pivot on arm 28 around pin 27.

As can be seen at this point, the present wire bending apparatus operates by attaching wire holding member 22 onto the end of a wire 11 to the point at which it is desired to bend wire 11, at which time wire engaging member 17 generally will be loosely engaging the wire 11. Actuation of the hydraulic cylinder 12 which has hydraulic pressure applied from a pump (not shown) for pumping hydraulic fluid into inlet pipe 13 to force cylinder rod 14 to extend or retract from the cylinder. The extended rod 14 will push arm 26 against pivot 27 and arm 28. Thus, the pressure will tend to separate the cylinder from the holding member 22, except that links 20 connected at pivots 21 on the holding member 22 and at pivots 16 on the cylinder 12, will allow movement between the cylinder 12 and the holding member 22 only on an arc formed by the links 20. As can be seen in FIG. 2, the hydraulic cylinder 12 is forced to remain substantially parallel to the wire 11 while the wire engaging member 17 engages the wire 11 and engaging means 17 forces the wire 11 to bend in holder 22 around the groove in arcuate wire guide 23. When the bending operation is complete, the cylinder 12 is backed off and the wire holding member 22 is disconnected from the wire.

It will be clear from these two views that hydraulic cylinder 12 will remain enerally parallel to the wire 11 and all other parts of the apparatus wil remain either parallel or very close to wire 11 both before, during and after the bending operation. For instance, as will be noticed in FIG. 2, the entire apparatus generally bends around with wire 11 so that while working in tight quarters such as panel boxes, and the like, the present wire bending apparatus 10 will remain out of the way of other components of the box because of the smallness of the apparatus, and the unique way in which it remains close to the wire that is being bent so as to require smaller working space, and a smaller amount of room around the wire during operation.

Turning now to FIG. 3, a perspective view may be seen of the present apparatus 10 and the hydraulic cylinder 12 and the hydraulic inlet line 13. The hydraulic cylinder rod 14 is shown in an extended position with arm 26 extending obliquely from the end thereof and movably connected to arm 28 by a shaft 27 extended through arm 28 and arm 26 which is located in a cleavage located in the end of arm 28. The wire engaging member 17 may be more clearly seen in this view, as can links 20 which are connected to sleeve 15, by pivots 16 to the wire holding member 22 by pivots 21. The wire holding member 23 may be more clearly seen here and forms the bottom portion of the wire holding member 22 so that the wire holding member 22 may be easily placed on an electrical cable, or the like, to be bent and the member 23 either is slipped on by pins 24 sliding on the cleft of cleavage 25. While member 23 is shown simply sliding in and out of a cleavage 25, it will be clear that this is all the hold that is necessary for this member, since the wire being bent will engage this and firmly hold it upon starting of the bending operation. The arcuate or sheave-like shape of the guide portion of member 23 and the wire engaging member 17 can be more clearly seen in this view.

Turning now to FIG. 4, cylinder 12 can be seen having rod 14 in a retracted position along with arm 26 connected at pivot 27 to arm 28 which forms a part of wire holding member 22. Sleeve 15 can be seen connected to wire engaging member 17 and one of the links 20 may be seen connected to sleeve 15 and also to the wire holding member 22. Wire guide member 23 which forms a portion of the bottom of the wire holding memebr 22 can be seen as can a reducing insert member 30 which is inserted in the wire holding member 22 for smaller sizes of wire or cable being bent so that the present apparatus can be used for different sizes of cable by having several inserts 30 which may advantageously be magnetically held but may be held by other means as well. A second insert may also be adapted to fit in wire engaging member 17 for fitting different types of wire.

The reducing insert member 30 can be seen in FIG. 5 inserted into the wire holding member 22 with the wire guide 23 inserted by pins 24 into cleavage 25 of member 22. Link 20 can also be seen connected at pivots 21 to member 22 so that a wire or cable or the like 11, which is smaller than the apparatus is normally made or can be easily bent as desired by the use of the apparatus with the insert 30.

Referring now to FIG. 6, a view may be seen taken along line 6—6 of FIG. 4 and illustrating the insert 31 for the wire engaging member 17 engaging a smaller electrical conductor 11. Wire engaging member 17 is connected to the sleeve 15 of the hydraulic cylinder 12 and the end of the hydraulic cylinder rod 14 having the arm 26 fixedly connected thereto may also be seen in this view, as can pivots 16 movably connecting link 20 to the sleeve 15. The wire reducing members 31 are shown as having a notch 32 for holding the reducing member in place during the bending operation. However, it should be clear that the wire producing inserts could be held by any means desired such as by magnetic force, by magnetizing the insert or placing a small magnet or magnets therein, without departing from the spirit and scope of the present invention.

FIG. 7 illustrates a typical wire reducing insert for the present invention, and while illustrated as insert 31 for the wire engaging member 17, a similar type insert may also be utilized for the wire holding members 22. The protrusion 32 may or may not be used, as desired, and may or may not be magnetized without the protruding member 32. Member 31 can be seen to be generally semicircular in design; can generally be the same shape and general size as the wire being bent and may be seen to have a half cylinder or sheave-like inner surface for engaging the wire.

At this point it will be clear that a wire bender has been provided which is adapted to bend heavy electrical cables, and the like, in locations where the working space is very limited, such as the end of cables to be connected in panel boxes. The present invention is not, however, to be construed as limited to the uses and embodiments illustrated since other uses, especially those requiring bending operations in tight working space or where easy portability and light weight may be desired. One variation, for instance, might use an electrical, mechanical, pneumatic or other actuating means rather than a hydraulic cylinder, the hydraulic cylinder being used because of its commercial availability.

It is also contemplated that any material may be used in building the present invention but because of the forces encountered, materials such as steel are preferred and would normally be used, but it should be clear that some parts could be made out of aluminum alloy, bronze, brass, or the like, and it might be desirable to have a part such as the wire guide coated with a lubricating material, such as Teflon, for ease in sliding into and off the wire and for give during the bending, even though this has not been found necessary in the models in current use.

This invention is not to be construed as limited to the particular forms disclosed herein, since these are to be regarded as illustrative rather than restrictive.

I claim:

1. A bending apparatus adapted to bend electrical conductors, and the like, comprising in combination:
   (a) actuating means having an extendable and retractable rod;
   (b) holding means adapted to be attached to a member to be bent;
   (c) member engaging means connected to said actuating means for engaging said member during bending thereof;
   (d) linkage means movably connecting said holding means to said actuating means; and
   (e) connecting means movably connecting said holding means to said extendable and retractable member of said actuating means for applying a force between said actuating means and said holding means to drive said holding means in a predetermined curved path whereby a member held in said holding means will be bent when said actuating means applies a force to said holding means.

2. The apparatus according to claim 1 in which said holding means includes a guide means for guiding the bending of said member.

3. The apparatus according to claim 2 in which said holding means has a removable portion whereby said holding means may be separated into two parts and reconnected around said member to be bent.

4. The apparatus according to claim 3 in which said linkage means includes two parallel links.

5. The apparatus according to claim 4 in which said actuating means includes a hydraulic cylinder and said extendable and retractable rod is a hydraulic cylinder rod adapted to be extended from said cylinder when hydraulic pressure is applied to said cylinder.

6. The apparatus according to claim 5 in which said connecting means has a link member movably attached to said hydraulic cylinder rod and fixedly attached to said holding means.

7. The apparatus according to claim 6 in which said member engaging means includes an arcuate shaped engaging portion fixedly attached to said hydraulic cylinder.

8. The apparatus according to claim 7 in which said holding means includes removable size reducing means for use with different size members to be bent.

9. The apparatus according to claim 8 in which said member engaging means includes removable size reducing means for use with different size members to be bent.

10. The apparatus according to claim 9 in which said guide means is a grooved arcuate shaped member fixedly attached to said removable portion of said holding means.

11. A bending apparatus adapted to bend electrical conductors, conduit, and the like, comprising in combination:
    (a) hydraulic cylinder actuating means having a rod adapted to be extended and retracted into said cylinder;
    (b) wire holding means for attaching said apparatus to a member to be bent;
    (c) first linkage movably linking said actuating means to said wire holding means;
    (d) second linkage means movably connecting said rod to said wire holding means;
    (e) engaging means attached to said hydraulic cylinder for engaging said member during bending; and
    (f) guide means attached to said wire holding means for guiding said member during bending whereby actuation of said hydraulic cylinder will extend said rod forcing said wire holding means to move relative to said cylinder, bending said member around said guide means.

12. The apparatus according to claim 11 in which said wire holding means has removable size reducing attachments for adapting said wire holding means for different size member to be bent.

13. The apparatus according to claim 12 in which the engaging means has removable size reducing attachments for adapting the engaging means for different size member to be bent.

14. The apparatus according to claim 13 in which said guide means is a grooved arcuate shaped member.

References Cited

UNITED STATES PATENTS

| | | | |
|---|---|---|---|
| 3,336,779 | 8/1967 | Schall | 72—217 |
| 2,892,479 | 6/1959 | Holsclaw | 72—309 |
| 2,852,064 | 9/1958 | Weber et al. | 72—217 |
| 1,816,218 | 7/1931 | Henry et al. | 72—369 |
| 1,349,219 | 8/1920 | Moore et al. | 72—387 |

CHARLES W. LANHAM, Primary Examiner

M. J. KEENAN, Assistant Examiner

U.S. Cl. X.R.

72—309, 388